United States Patent
Faruque et al.

(10) Patent No.: US 8,910,971 B1
(45) Date of Patent: Dec. 16, 2014

(54) ROTATABLE AIRBAG MODULE MOUNTING MECHANISM

(71) Applicant: Ford Global Technologies, LLC, Dearborn, MI (US)

(72) Inventors: Mohammed Omar Faruque, Ann Arbor, MI (US); Dean M. Jaradi, Macomb, MI (US); Fubang Wu, Woodhaven, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/260,611

(22) Filed: Apr. 24, 2014

(51) Int. Cl.
*B60R 21/16* (2006.01)

(52) U.S. Cl.
USPC .............................................. 280/728.2

(58) Field of Classification Search
USPC .............................................. 280/728.2
See application file for complete search history.

(56) References Cited

U.S. PATENT DOCUMENTS

| | | | |
|---|---|---|---|
| 5,360,231 A | 11/1994 | Adams | |
| 5,934,733 A * | 8/1999 | Manwaring | 296/72 |
| 6,113,134 A | 9/2000 | Lim | |
| 6,951,348 B2 * | 10/2005 | Enders | 280/728.2 |
| 6,983,954 B2 * | 1/2006 | Sakaguchi | 280/728.2 |
| 8,033,356 B2 * | 10/2011 | Kim | 180/271 |
| 8,540,274 B2 * | 9/2013 | Bristol et al. | 280/728.2 |
| 2009/0315303 A1 * | 12/2009 | Ettinger | 280/728.2 |

FOREIGN PATENT DOCUMENTS

WO        WO 0144026        6/2001

* cited by examiner

*Primary Examiner* — Faye M. Fleming
(74) *Attorney, Agent, or Firm* — Frank A. MacKenzie; Bejin Bieneman PLC

(57) ABSTRACT

An apparatus includes a mount assembly configured to rotatably couple to a vehicle beam and configured to support an airbag module. The apparatus further includes a connecting mechanism configured to selectively fix the mount assembly to the beam in a first position and configured to disengage at a threshold torque. The mount assembly includes a first stop member configured to engage the beam upon rotation of the mount to a second position.

20 Claims, 4 Drawing Sheets

ROTATABLE AIRBAG MODULE MOUNTING MECHANISM

BACKGROUND

Vehicles, such as automobiles, may include equipment for protecting passengers from the impact of collisions, for example, safety belts, airbags and energy absorption mechanisms. It is desirable to control equipment such as airbags to adjust to certain collision conditions, such as collision forces on a vehicle which cause movement of passengers within the vehicle. Current mechanisms for providing such control for equipment such as airbags suffer from drawbacks including, for example, their complexity and cost.

DRAWINGS

FIG. 5B is another exemplary perspective view of the exemplary rotatable airbag module mounting mechanism and the exemplary instrument panel beam of FIG. 2, with the airbag mounting mechanism in a second position relative to the instrument panel beam.

DETAILED DESCRIPTION

Figure 1:
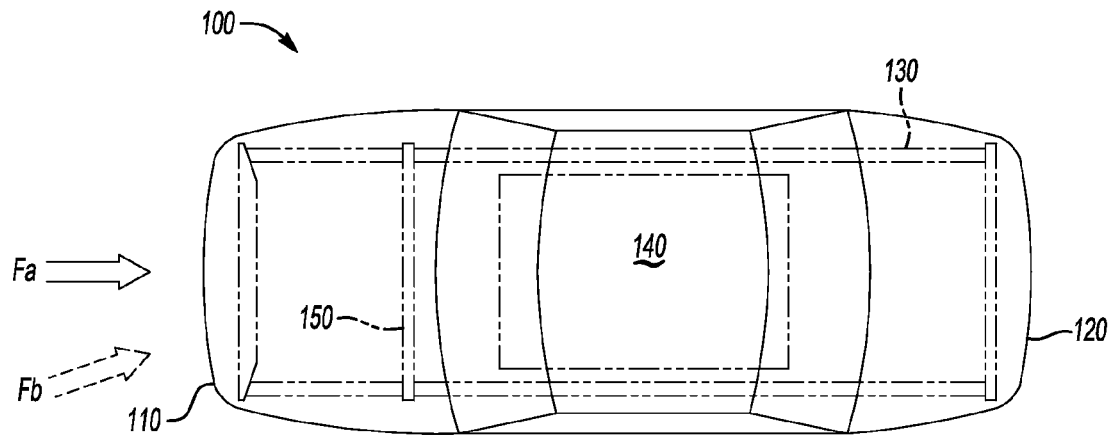
FIG. 1 is a top view of an exemplary vehicle.

FIG. 1 is an exemplary illustration of a vehicle 100 with a front end 110 and a back end 120. The vehicle 100 includes a frame assembly 130, and a passenger cabin 140. The frame assembly 130 includes an instrument panel beam 150 extending in a lateral direction across vehicle 100. The instrument panel beam 150 is longitudinally forward of and adjacent to the passenger cabin 140. The instrument panel beam 150 supports an instrument panel 160 (FIGS. 6A and 6B) and an airbag mounting mechanism 200 (FIGS. 2-5).

Figure 2:
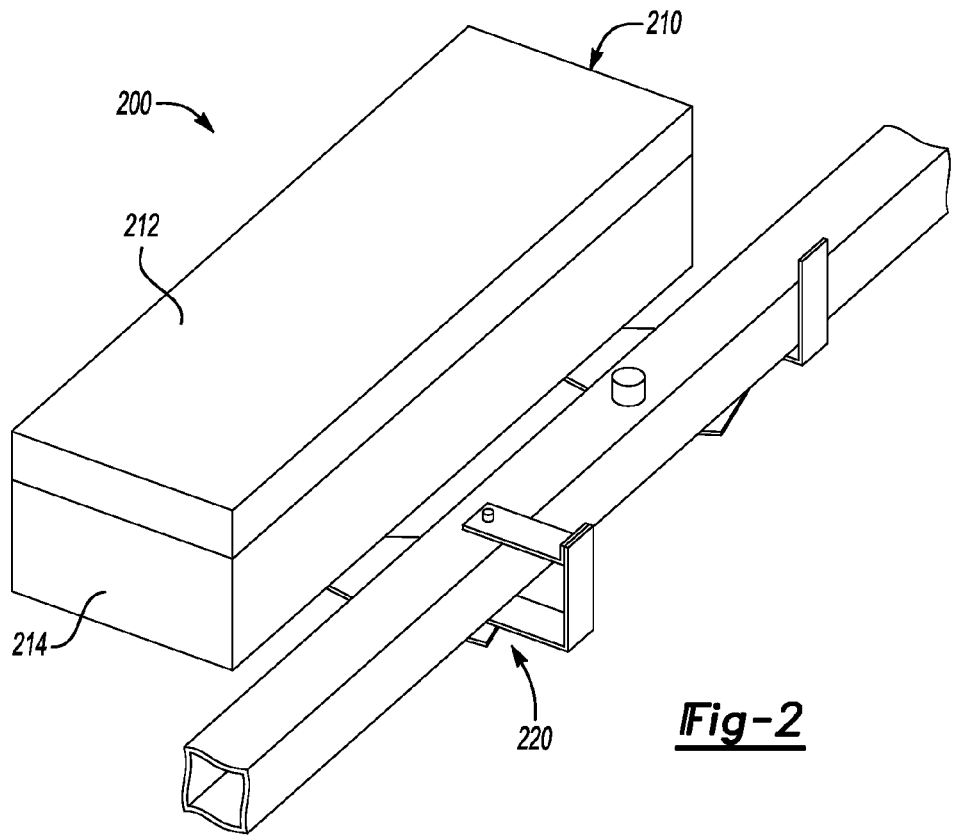
FIG. 2 is an exemplary perspective view of an exemplary rotatable airbag module mounting mechanism engaged with an exemplary instrument panel beam for a vehicle.

FIG. 2 is a perspective view of the airbag mounting mechanism 200. The airbag mounting mechanism 200 supports an airbag module 210 relative to the instrument panel beam 150. The airbag module 210 includes, for example, an airbag component 212 and an inflator component 214. The vehicle 100 operates the airbag module 210 under certain conditions, e.g., a collision with the front end 110 of the vehicle 100 of a certain magnitude. For example, the vehicle 100 may include a vehicle computer (not shown) in communication with the airbag module 210 that generally includes a processor and a memory, the memory including one or more forms of computer-readable media, and storing instructions executable by the processor for performing various operations, including as disclosed herein. Further, the computer may include more than one computing device, e.g., controllers or the like included in the vehicle 100 for monitoring and/or controlling various vehicle components, e.g., an engine control unit (ECU), transmission control unit (TCU), etc. The computer is generally configured for communications on a controller area network (CAN) bus or the like. The computer may also have a connection to an onboard diagnostics connector (OBD-II). Via the CAN bus, OBD-II, and/or other wired or wireless mechanisms, the computer may transmit messages to various devices in a vehicle and/or receive messages from the various devices, e.g., controllers, actuators, sensors, etc., including the airbag module 210. Alternatively or additionally, in cases where the computer actually comprises multiple devices, the CAN bus or the like may be used for communications between the multiple devices that comprise the vehicle computer. In addition, the computer may be configured for communicating with a network, which may include various wired and/or wireless networking technologies, e.g., cellular, Bluetooth, wired and/or wireless packet networks, etc.

Figure 3:
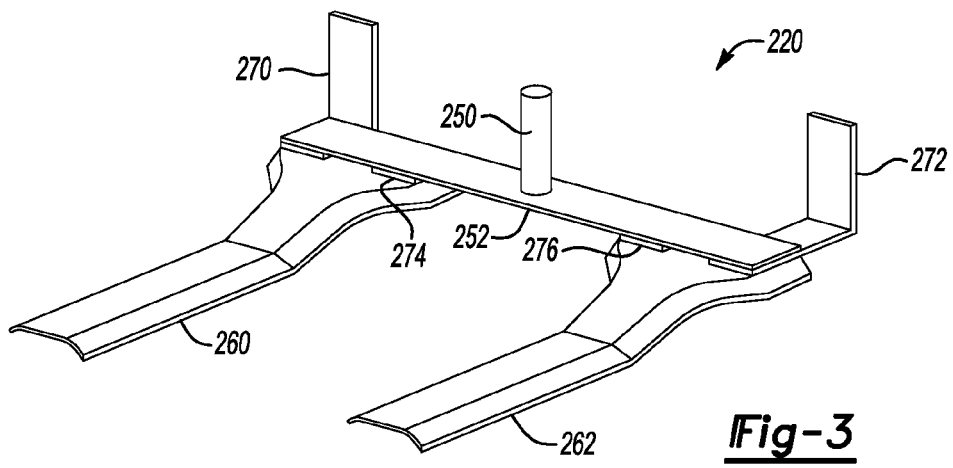
FIG. 3 is an exemplary perspective view of the mount assembly of the exemplary rotatable airbag module mounting mechanism of FIG. 2.
Figure 4A:
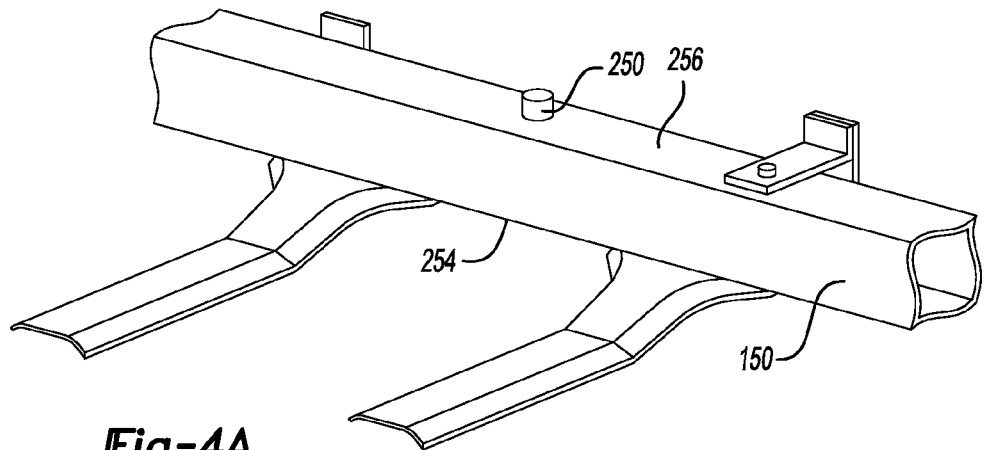
FIG. 4A is an exemplary perspective view of the mount assembly of FIG. 3 engaged with the exemplary instrument panel beam of FIG. 2.
Figure 4B:
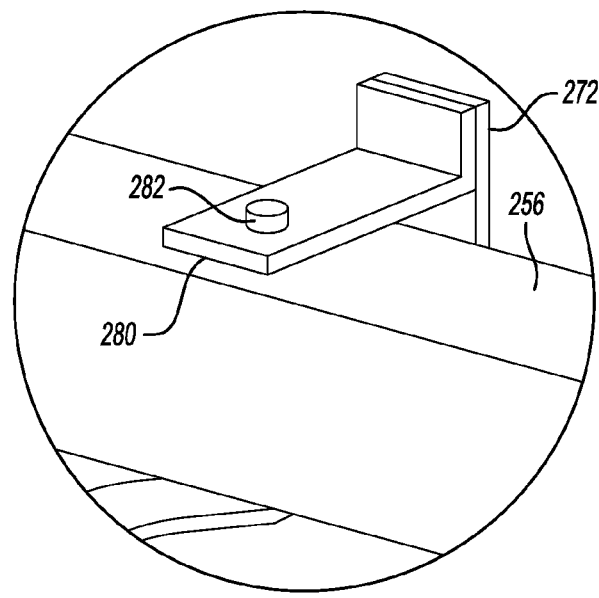
FIG. 4B is an enlarged view of a portion of FIG. 4A.

FIGS. 3-4 are perspective views including components of the airbag mounting mechanism 200. The airbag mounting mechanism 200 further includes a mount assembly 220 rotatably supporting the airbag module 210 relative to the instrument panel beam 150 of the vehicle 100. The mount assembly 220 includes a substantially vertically-extending cylindrical support post 250 rotatably coupled to top and bottom portions 254 and 256 of the instrument panel beam 150 at apertures extending therethrough (not shown). The post 250 is vertically fixed relative to the instrument panel beam 150 by one or more pins (not shown). It should be understood that the configuration of the engagement of the post 250 and the instrument panel beam 150 may vary.

The post 250 is fixed, e.g., by welding, one or more fasteners, and/or adhesive, to a mount support member 252. The mount support member 252 is configured to extend along the instrument panel beam in a lateral direction. Airbag support brackets 260 and 262 are fixed at opposing ends of the mount support member 252. The airbag support brackets 260, 262 extend in a generally longitudinal direction, and are configured to receive the airbag module 210 thereon, as shown in FIGS. 2 and 5.

The mount assembly 220 further includes stop members 270 and 272 fixed at opposing ends of the mount support member 252. The stop members 270, 272 are secured between the mount support member 252 and the airbag support brackets 260, 262, respectively, and extend substantially vertically so as to overlap with the instrument panel beam 150 of the vehicle 100. In one example, illustrated in FIGS. 2-5, the stop members 270 and 272 are longitudinally spaced apart relative to the mount support member 252. The mount assembly 220 may further include spacing members 274, 276 also between the mount support member 252 and the airbag support brackets 260, 262, respectively.

The mount assembly 220 also includes a lock bracket 280 fixed to the stop member 272 and longitudinally extending over the top portion 256 of the instrument panel beam 150. A locking member 282 extends between the lock bracket 280 and the top portion 256 of the instrument panel beam 150, and is received in each component by, e.g., apertures (not shown). As such, the locking member 282 inhibits rotation of the airbag mounting mechanism 200 relative to the instrument panel beam 150. At a threshold torque, the locking member 282 disengages and, therefore, decouples the lock bracket 280 and the top portion 256 of the instrument panel beam 150. For example, the lock member 282 may be in the form of a plastic push pin that fails and breaks apart at the threshold torque. In other examples, the locking member 282 may be in the form of other fasteners that selectively disengage at the threshold torque, such as an exploding bolt.

The components of the mount assembly 220 may have a variety of configurations, such as including a variety of materials. For example, the post 250, the mount support member 252, the airbag support brackets 260, 262, and the stop members 270, 272 may include steel, aluminum, carbon fiber and/or plastic materials.

Figure 5A:
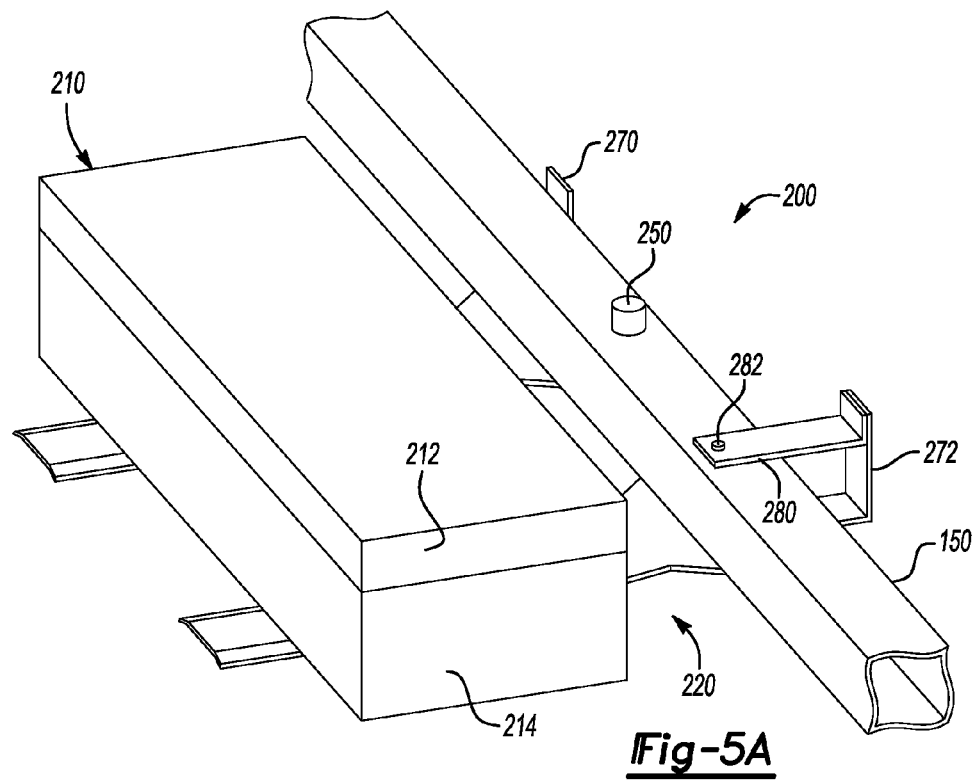
FIG. 5A is another exemplary perspective view of the exemplary rotatable airbag module mounting mechanism and the exemplary instrument panel beam of FIG. 2, with the airbag mounting mechanism in a first position relative to the instrument panel beam.
Figure 5A:
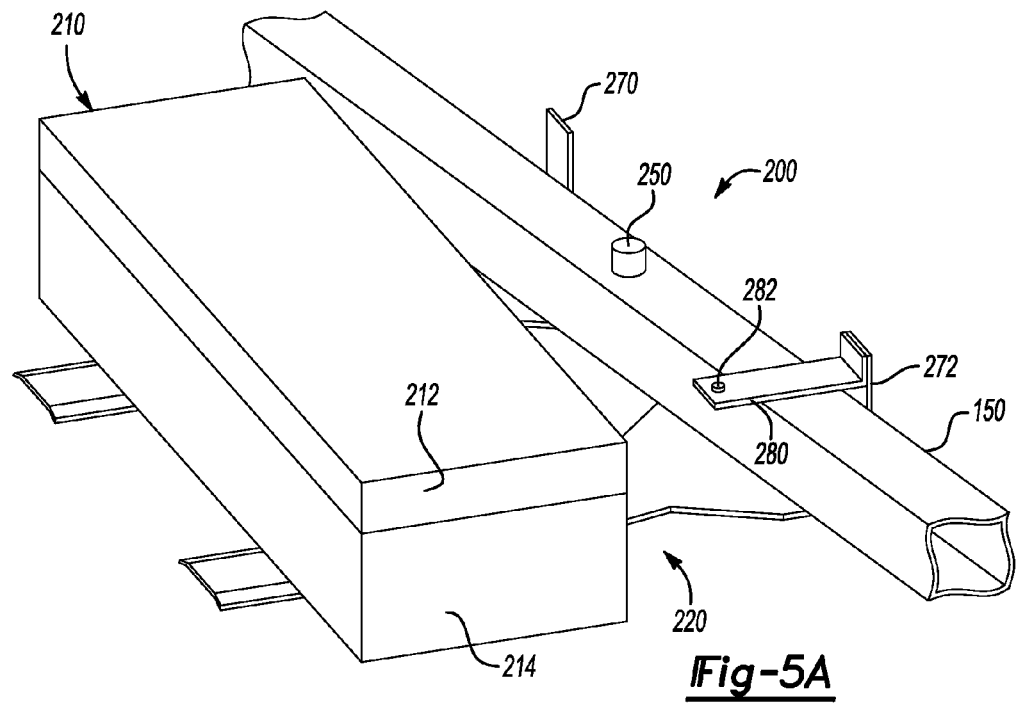
Figure 6A:
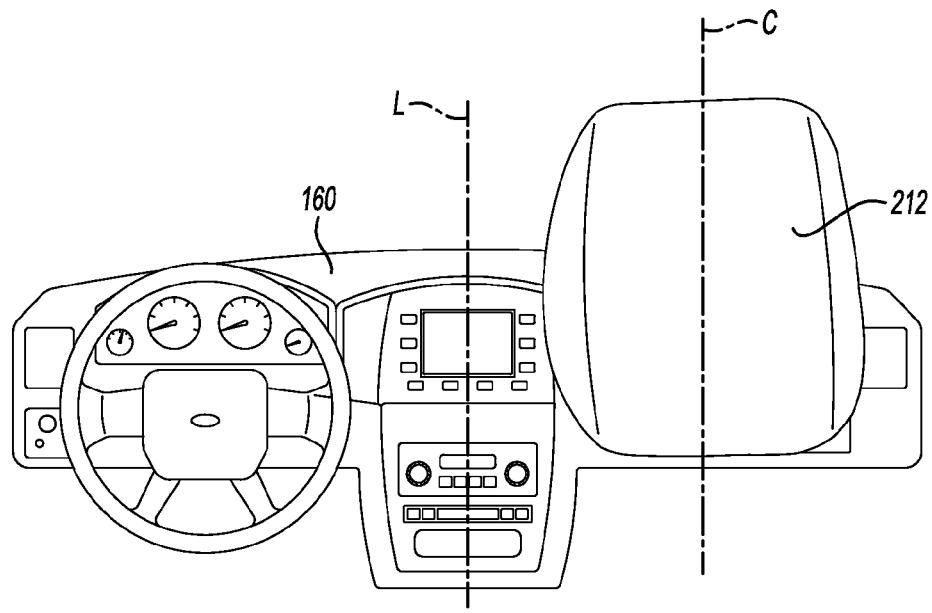
FIG. 6A is a side view of an exemplary instrument panel for a vehicle and a deployed airbag in a first position.
Figure 6B:
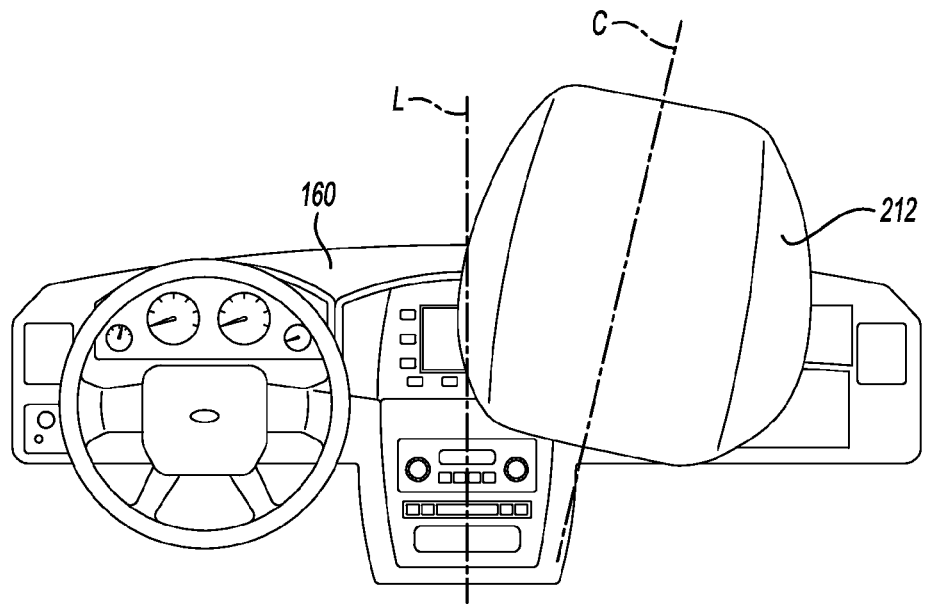
FIG. 6B is a side view of an exemplary instrument panel for a vehicle and a deployed airbag in a second position.

FIGS. 5A and 5B illustrate exemplary perspective view of the airbag mounting mechanism 200 in a first and second position, respectively. FIGS. 6A and 6B illustrate exemplary side views view of the airbag 212 having been deployed with the airbag mounting mechanism 200 in the first and second positions, respectively. In the first position illustrated in FIG. 5A, the lock bracket 280 is coupled to the instrument panel beam 150. Accordingly, the airbag mounting mechanism 200 is rotatably fixed relative to the instrument panel beam 150. In the exemplary first position, the airbag module 210 is oriented along the instrument panel beam 150, corresponding to a direction extending laterally across the vehicle 100. In one example, in response to a longitudinally directed force, such as a force Fa (FIG. 1) applied to the front end 110 of the vehicle 100, the airbag mounting mechanism 200 remains in the first position, as such an applied force does not generate sufficient torque on the vehicle 100 to disengage the lock bracket 280 from the instrument panel beam member 150. Moreover, in the absence of the threshold torque, movement of any passenger in the vehicle at that seating location corresponding with the airbag mounting mechanism 200 would likely be substantially constrained (with other collision mitigation equipment, such as seatbelts) to the longitudinal direction of the force Fa. Therefore, when the airbag module 210 deploys the airbag 212 in the first position in response to Fa, as illustrated in FIG. 6A, the airbag 212 is oriented with its deployed center line C parallel to a center line L of the vehicle 100, to provide collision mitigation in the expected range of movement of a passenger in that seat.

In the second position illustrated in FIG. 5B, the lock bracket 280 is de-coupled from the instrument panel beam 150. In one example, in response to an oblique force, such as a force Fb (FIG. 1) at the front end 110 of the vehicle 100, the airbag mounting mechanism 200 rotates to the second position, as such an applied force generates the threshold torque on the vehicle 100 to disengage the lock bracket 280 from the instrument panel beam member 150. Moreover, with the presence of at least the threshold torque, movement of a passenger in the vehicle at that seating location would be expected in the direction corresponding with that torque; with the oblique direction of force Fb, "clockwise" movement of a passenger towards the center of the vehicle 100 would be expected. Therefore, when the airbag module 210 deploys the airbag 212 in the second position in response to Fb, as illustrated in FIG. 6B, the airbag 212 is oriented with its deployed center line C rotated toward the center line L of the vehicle 100, to provide collision mitigation in the expected range of movement of a passenger in that seat. The location of the stop member 272 defines the second position of the airbag mounting mechanism 200 relative to the instrument panel beam 150.

In the example of FIGS. 2-5, the stop member 270 is position to inhibit rotation of the airbag mounting mechanism 200 in the "counterclockwise" direction relative to the instrument panel beam 150. For example, with the airbag mounting mechanism 200 corresponding to the front passenger seat of the vehicle 100, as illustrated in FIGS. 6A and 6B, in the event of an collision with the front end 110 with an oblique force on the opposite lateral side of the vehicle 100 from the force Fb, while the threshold torque to de-couple the locking bracket 280 and the instrument panel beam 150 may be met, the stop member 270 would prevent rotation of the airbag mounting mechanism 200, as the vehicle 100 may include such features as side curtain airbags (not shown) to provide collision mitigation in the expected range of movement of a passenger in that seat under those circumstances. It would be understood that the stop member 270 may be located in a variety of positions, including positions that provide for a third position of the airbag mounting mechanism 200, under conditions that would generate a "counterclockwise" rotation of the airbag mounting mechanism 200.

An airbag module mounting mechanism according to the present disclosure may further vary in numerous ways according to the present disclosure. For example, the various components may be arranged in a mirrored configuration, to provide an airbag module mounting mechanism for the other side of a vehicle. The mechanism can have a variety of configurations to provide define the amount of rotation for the particular size and configuration of the vehicle. In another example, an airbag module mounting mechanism according to the present disclosure may include an airbag module with a variety of configurations.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An apparatus comprising:
   a mount assembly configured to rotatably couple to a vehicle beam and configured to support an airbag module; and
   a connecting mechanism configured to selectively fix the mount assembly to the beam in a first position and configured to disengage at a threshold torque,
   wherein the mount assembly includes a first stop member configured to engage the beam upon rotation of the mount to a second position.

2. The apparatus of claim 1, wherein the connecting mechanism includes a fastener configured to couple the mount assembly and the beam.

3. The apparatus of claim 2, wherein the fastener fails at the threshold torque.

4. The apparatus of claim 3, wherein the fastener includes plastic material.

5. The apparatus of claim 1, wherein the mount assembly includes a second stop member fixed thereto.

6. The apparatus of claim 5, wherein the second stop member is configured to engage the beam and inhibit rotation of the mount from the first position in the direction opposite the second position.

7. The apparatus of claim 1, wherein mount assembly includes a support post configured to rotatably engage with the beam and a support member extending between the support post and the first stop member.

8. The apparatus of claim 7, wherein the mount assembly further includes at least one support bracket fixed to the support member and configured to receive an airbag module.

9. The apparatus of claim 1, wherein the mount assembly includes a lock bracket extending from the first stop member.

10. The apparatus of claim 9, wherein connecting mechanism engages the lock bracket.

11. An apparatus comprising:
a vehicle beam;
a mount rotatably coupled to the beam and configured to support an airbag module; and
a connecting mechanism selectively fixing the mount to the beam in a first position and configured to disengage at a threshold torque,
wherein the mount includes a first stop member fixed at least partially radially apart from the beam and configured to engage the beam upon rotation of the mount to a second position.

12. The apparatus of claim 11, wherein the connecting mechanism includes a fastener extending coupling the mount and the beam.

13. The apparatus of claim 12, wherein the fastener fails at the threshold torque.

14. The apparatus of claim 13, wherein the fastener includes plastic material.

15. The apparatus of claim 11, wherein the mount includes a second stop member fixed thereto.

16. The apparatus of claim 15, wherein the second stop member engages the beam and inhibits rotation of the mount from the first position in the direction opposite the second position.

17. The apparatus of claim 11, wherein mount includes a support post rotatably engaged with the beam and a support member extending between the support post and the first stop member.

18. The apparatus of claim 17, wherein the mount further includes at least one support bracket fixed to the support member and configured to receive an airbag module.

19. The apparatus of claim 11, further comprising an airbag module fixed to the mount.

20. The apparatus of claim 11, wherein the mount includes a lock bracket extending from the first stop member, and the connecting mechanism engages the lock bracket and the beam.

* * * * *